United States Patent
Hasegawa et al.

(10) Patent No.: US 7,677,284 B2
(45) Date of Patent: Mar. 16, 2010

(54) PNEUMATIC TIRE WITH TREAD TAPE RADIALLY INSIDE CARCASS AND METHOD OF MANUFACTURING THE SAME

(75) Inventors: Hirotsugu Hasegawa, Kobe (JP); Naoki Yukawa, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 880 days.

(21) Appl. No.: 11/271,930

(22) Filed: Nov. 14, 2005

(65) Prior Publication Data
US 2006/0113019 A1   Jun. 1, 2006

(30) Foreign Application Priority Data
Dec. 1, 2004   (JP)   .............................. 2004-348848

(51) Int. Cl.
*B60C 9/00*   (2006.01)
*B60C 5/00*   (2006.01)
*B60C 5/14*   (2006.01)
*B60C 19/00*   (2006.01)

(52) U.S. Cl. .................... 152/196; 152/197; 152/450; 152/510; 156/110.1

(58) Field of Classification Search ......... 152/196–207, 152/450, 510; 156/110.1
See application file for complete search history.

(56) References Cited

U.S. PATENT DOCUMENTS 622,303 A * 4/1899 Wayne
5,597,426 A * 1/1997 Ludwig ................... 152/200
6,343,843 B1 * 2/2002 Nishikawa
6,581,658 B2 * 6/2003 Nakajima et al.
2004/0182494 A1 * 9/2004 Dominak et al.
2005/0155686 A1 * 7/2005 Yukawa et al.

FOREIGN PATENT DOCUMENTS

DE   19 28 039 A1   12/1970
EP   1 004 460 A2   5/2000
EP   1 004 460 A3   5/2000

(Continued)

OTHER PUBLICATIONS

Mechanics of Pneumatic Tires, ed. Samuel Clark, U.S. Department of Transportation, Aug. 1981, pp. 880-881.*
Mechanics of Pneumatic Tires, ed. Samuel Clark, US Department of Transportation, Aug. 1981, p. 209.*
Internet Hawley'S Condensed Chemical Dictionary, 14th ed., John Wiley & Sons Inc., 2002, definition of "paper".*

*Primary Examiner*—Adrienne C Johnstone
(74) *Attorney, Agent, or Firm*—Birch, Stewart, Kolasch & Birch LLP

(57) ABSTRACT

A pneumatic tire including a tread portion, a pair of sidewall portions, a pair of bead portions, and a carcass extending between the bead portions through the tread portion and sidewall portions, wherein the tread portion is provided radially inside the carcass with a tread tape having a thickness of not more than 2.0 mm and having a tensile elastic modulus larger than any rubber existing between the tread tape and the adjacent carcass cords. A method of manufacturing the pneumatic tire includes vulcanizing a main body of the tire, excepting the tread tape, and attaching the tread tape onto the inside of the vulcanized tire main body.

9 Claims, 4 Drawing Sheets

FOREIGN PATENT DOCUMENTS

| | | |
|---|---|---|
| EP | 1 424 221 A1 | 6/2004 |
| JP | 7-149108 A | 6/1995 |
| JP | 9-165469 A | 6/1997 |
| WO | WO-00/78562 A1 * | 12/2000 |
| WO | WO-02/18158 A2 | 3/2002 |
| WO | WO-02/18158 A3 | 3/2002 |
| WO | WO-03/103989 A1 * | 12/2003 |

* cited by examiner

PNEUMATIC TIRE WITH TREAD TAPE RADIALLY INSIDE CARCASS AND METHOD OF MANUFACTURING THE SAME

BACKGROUND OF THE INVENTION

The present invention relates to a pneumatic tire and a method of manufacturing the same, more particularly to a flexible tape disposed on the inside of the tread portion to improve steering stability and ride comfort of the tire.

In the pneumatic tires especially for passenger cars, conventionally employed in order to improve the steering stability is to increase the rigidity of the sidewall portions and/or tread portion by adjusting the properties, e.g. hardness, modulus and the like of rubber components used therein and also providing reinforcing cord layers therein such as tread belt and bead reinforcing layer. such techniques for increasing the rigidity are usually liable to deteriorate ride comfort.

On the other hand, a pneumatic tire is, in order to use without tire tube, conventionally provided along the inner surface thereof with an innerliner made of an air-impermeable rubber compound. And it has been believed that, no additional component or layer is to be disposed on the inside of the tire not to break the seal.

The inventors are however, studied and found that, by disposing a tape having special characteristics in a special position on the inside of the tire, the steering stability and ride comfort can be improved without deteriorating the sealing performance.

SUMMARY OF THE INVENTION

It is therefore, an object of the present invention to provide a pneumatic tire and a method of manufacturing the same, in which the steering stability can be improved without deteriorating the ride comfort.

According to the present invention, a pneumatic tire comprises a tread portion, a pair of sidewall portions, a pair of bead portions, and a carcass made of cords extending between the bead portions through the tread portion and sidewall portions, wherein the tread portion is provided radially inside the carcass with a flexible tread tape having a thickness of not more than 2.0 mm, and made of a material having a tensile elastic modulus larger than any rubber existing between the tread tape and the adjacent carcass cords.

Therefore, the in-plane bending rigidity and in-plane torsional rigidity of the tread portion are increased by the tread tape. During cornering, if the frictional force between the tread face and road surface is sufficiently large, the larger in-plane bending rigidity generates a larger side force. Accordingly, the pneumatic tire according to the present invention generates a larger side force and thereby the steering stability can be improved. Further, against expectations, ride comfort especially when running over a protrusion can be improved.

BRIEF DESCRIPTION OF THE DRAWINGS

Embodiments of the present invention will now be described in detail in conjunction with the accompanying drawings, in which.

DETAILED DESCRIPTION OF THE INVENTION

Figure 1:
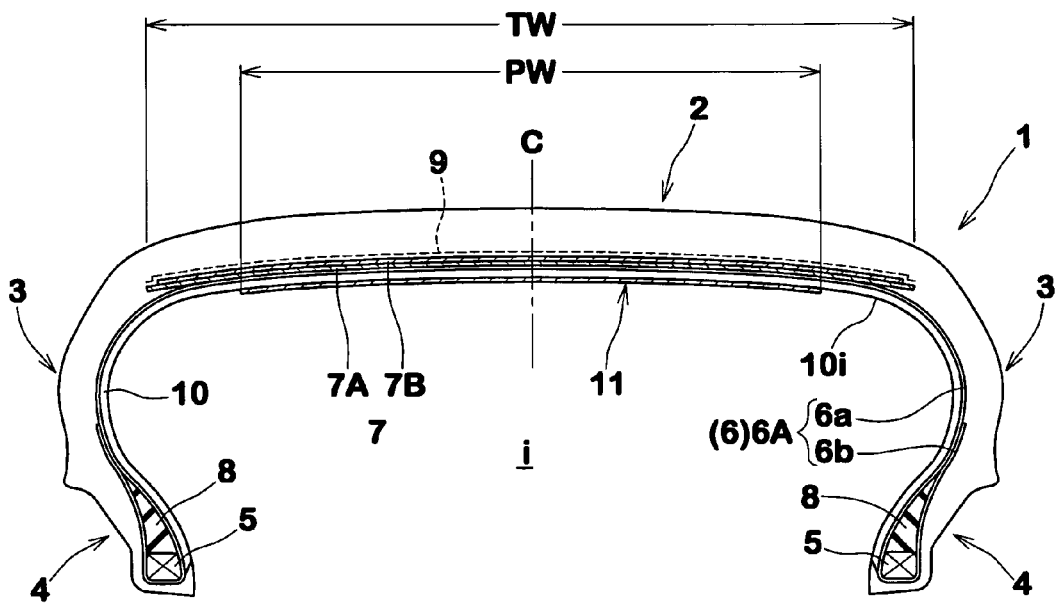
FIG. 1 is a cross sectional view of a pneumatic tire according to the present invention.
Figure 2:
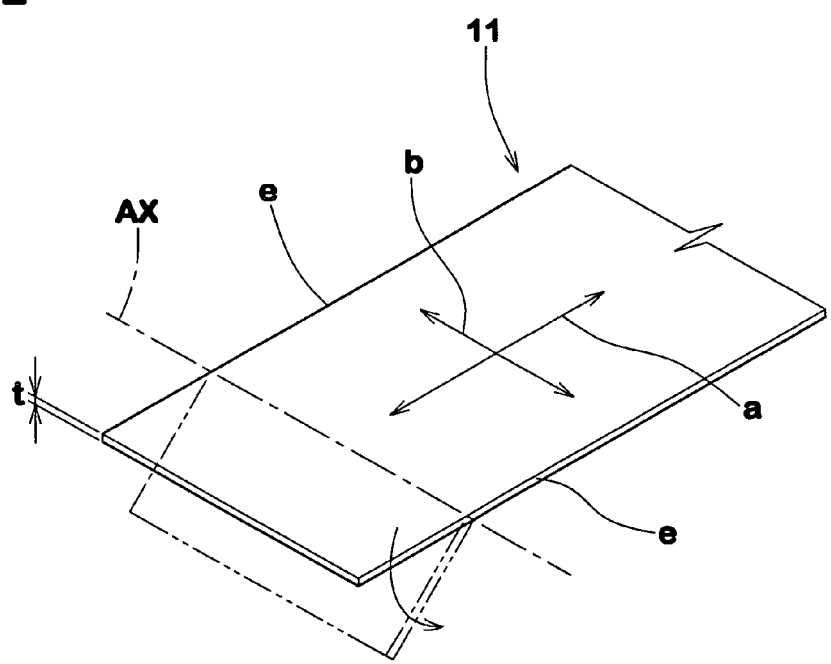
FIG. 2 is a perspective view of a tread tape having a constant width.

According to the present invention, pneumatic tire 1 comprises a tread portion 2, a pair of sidewall portions 3, a pair of bead portions 4, a carcass 6 extending between the bead portions 4 through the tread portion 2 and sidewall portions 3, and a belt 7, 9 disposed radially outside the carcass 6 in the tread portion 2.

The carcass 6 is composed of at least one ply 6A of cords arranged radially at an angle in the range of from 70 to 90 degrees with respect to the tire equator CO, extending between the bead portions 4 through the tread portion 2 and sidewall portions 3 and turned up around the bead core 5 in each bead portion 4 from the axially inside to the axially outside of the tire to form a pair of turnup portions 6b and a main portion 6a therebetween.

The belt comprises a breaker 7 and optionally a band 9. The breaker 7 comprises at least two cross plies 7A and 7B of high modulus cords e.g. steel cords, laid at an angle of from 10 to 40 degrees with respect to the tire equator CO.

The band 9 is composed of an organic fiber cord or cords wound on the radially outside of the breaker 7 at a small angle of at most about 5 degrees for example almost zero degree with respect to the tire equator CO.

In the following embodiments, the tires are a tubeless radial tire for passenger cars. The carcass 6 is composed of a single ply 6A of organic fiber cords arranged radially at an angle of 90 degrees with respect to the tire equator CO. The breaker 7 consists of the two cross plies 7A and 7B each extending across the substantially entire tread width TW. On the radially outside of the breaker 7, a band 9 extending across the entire width of the breaker 7 is disposed.

On the inside of the carcass 6 in this example, an innerliner 10 made of an air-impermeable rubber compound is disposed. For the air-impermeable rubber compound, butyl rubber, halogenated butyl rubber, brominated butyl rubber, and the like, namely, butyl-based rubber compounds are suitably used. As shown in FIG. 1, the innerliner 10 extends from one of the bead cores 5 to the other, facing the tire cavity (i), so as to cover the almost entire inner surface of the tire.

In this example, the innerliner 10 is provided as a separate layer from the carcass, but it is also possible to provide the innerliner 10 as the innermost part or inner surface layer of the topping rubber of the carcass cords, in other words, at least the innermost part of the topping rubber is the air-impermeable rubber and the separate innerliner is not provided.

In the tread portion 2, a tread tape 11 is provided on the inside of the carcass 6. The tread tape 11 may be disposed between the above-mentioned separate innerliner 10 and the carcass, but in view of the manufacturing cost, working efficiency and the like, the tread tape 11 is preferably disposed on the inside of the innerliner 10 irrespectively of being the separate layer or the innermost part of carcass topping rubber.

In the following embodiments, therefore, the tread tape 11 is adhered to the inner surface 10i of the innerliner 10 as the radially innermost material and thus, the tread tape 11 is exposed in the tire cavity (i).

The tread tape 11 may be divided in the tire axial direction and/or in the tire circumferential direction, but preferably the tread tape 11 extends continuously in the tire circumferential direction substantially once around the tire, namely, it is preferable that gap or overlap between the circumferential ends of the tape is substantially zero. But, a small gap of less than about 10 mm or a small overlap of less than about 10 mm may be permitted. In any case, it is preferable that the circumferential ends are straight in parallel with the tire axial direction rather than bias cut for the in-plane torsional rigidity.

The tread tape 11 must be flexible, and the tread tape 11 has to be larger in the tensile elastic modulus than any rubber (e.g. inner liner rubber, carcass topping rubber and the like) existing between the tread tape 11 and the adjacent carcass cords namely the innermost carcass cords.

As the material of the tread tape 11 having such a larger tensile elastic modulus, various homogeneous material such as paper, woven fabric, nonwoven fabric, and resin or plastic sheet may be used.

As to the paper, strong and light weight paper made from pulp such as kraft paper (sulfate paper) and silk paper are preferred.

The fabric is a sheet of fibers and/or threads formed by weaving, knitting, felting, hot fusion bonding or the like. As to the fibers, natural fibers such as cotton, wool, silk, hemp and the like and chemical fibers such as rayon, polyester, nylon, vinylon, acetate and the like can be used. Especially, viscose staple fabric, nonwoven fabric, cotton fabric and the like are preferably used for the large tensile modulus and low cost.

As to the resin or plastic sheet, for example, polyvinyl chloride resin, polypropylene (PP) resin, acrylate resin, polyester resin, polyethylene (PE) resin, polyimide resin, nylon resin, cellulose (cellophane), and the like can be used. Further, plastic foam sheet such as acrylic foam and poly-urethane foam may be used too.

In this example, with respect to the tensile elastic modulus, an isotropic material is used to improve the in-plane torsional rigidity as well as the in-plane bending rigidity. But, an anisotropic material such that the modulus in the longitudinal direction (a) of the tape or the circumferential direction of the tire is larger than the modulus in the widthwise direction (b) of the tape or the axial direction of the tire, giving preference to the in-plane bending rigidity over the in-plane torsional rigidity.

In any material, if the thickness (t) of the tread tape 11 becomes more than 2.0 mm, as the out-plane bending rigidity of the tape increases and accordingly flexibility is lost, the ride comfort will be deteriorated and separation becomes liable to occur. Thus, the thickness (t) is preferably not more than 2.0 mm, more preferably not more than 1.6 mm. On the other hand, the lowest value of the thickness (t) will be determined depending on the required tensile modulus and strength, but in view of handling, it is preferable that the thickness (t) is at least 0.02 mm.

As to the strength of the tread tape 11, the tensile strength (Ra) in the longitudinal direction (a) of the tape is not less than 11 N/10 mm, preferably more than 13 N/10 mm, more preferably more than 15 N/10 mm, but not more than 220 N/10 mm, preferably less than 100 N/10 mm, more preferably less than 60 N/10 mm. The tensile strength (Rb) in the widthwise direction (b) of the tape is not less than 11 N/10 mm, preferably more than 13 N/10 mm, more preferably more than 15 N/10 mm, but not more than 130 N/10 mm, preferably less than 100 N/10 mm, more preferably less than 60 N/10 mm. The strength (Rb) is equal to or less than the strength (Ra).

The tensile strength in a certain direction is defined as the breaking strength in Newton per 10 mm tape width (N/10 mm) measured in the certain direction according to the Japanese Industrial standard JIS-Z0237, "Testing methods of pressure-sensitive tapes and sheets", "8. Tensile strength and Elongation".

If the tensile strength is less than 11 N/10 mm in the tire circumferential direction and tire axial direction, the in-plane bending rigidity of the tread portion 2 can not be increased and it becomes difficult to improve the steering stability. If the tensile strength in the tire circumferential direction is more than 220 N/10 mm or the tensile strength in the tire axial direction is more than 130 N/10 mm, then such a material excessively increases the rigidity of tread portion and ride comfort will be deteriorated.

If the width PW of the tread tape 11 is too small, it is difficult to increase the in-plane bending rigidity of the tread portion 2. Therefore, it is preferable that the width PW of the tread tape 1 is set in a range of not less than 10%, more preferably more than 20%, still more preferably more than 40% of the ground contacting width TW. If two or more tread tapes 11 are disposed within the ground contacting width TW in parallel with each other, the total width thereof should be limited in this range.

The width of the single tape or the total width of a plurality of tapes may be varied in the tire circumferential direction. In this case, the mean value thereof is limited within the above-mentioned range.

If the width PW of the single tread tape 11 becomes too large, the tape edges approach or lie in the tire shoulder portions where the radius of curvature in the tire meridian section is decreased, and accordingly, the edges are liable to be crimpled and partially separated from the inner surface 10i. This is not preferable for the durability. Thus, the width PW is set in a range of not more than 90%, preferably less than 80%, more preferably less than 70% of the ground contacting width TW.

In the case that two or more tapes are disposed, the width between the axially outermost edges should be used instead of the width of each tape, independently of the gap(s) G between the tapes. preferably, the gap G is less than 20 mm, more preferable less than 10 mm.

Here, the ground contacting width TW is the axial width measured under a normally inflated unloaded condition between the tread edges defined by the axial outermost edges of the ground contacting region under a normally inflated loaded condition.

The normally inflated unloaded condition is such that the tire is mounted on a standard wheel rim and inflate to a standard pressure but loaded with no tire load.

The normally inflated loaded condition is such that the tire mounted on the standard wheel rim and inflate to the standard pressure is loaded with a standard tire load.

The standard wheel rim is a wheel rim officially approved for the tire by standard organization, i.e. JATMA (Japan and Asia), T&RA (North America), ETRTO (Europe), STRO (Scandinavia) and the like. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load capacity" in ETRTO, the maximum value given in the above-mentioned table in TRA or the like.

In the case of passenger car tires, however, the standard pressure and standard tire load are uniformly defined by 180 kPa and 88% of the maximum tire load, respectively.

The width PW of the tread tape 11 is a value measured under the normally inflated unloaded condition.

Figure 3:
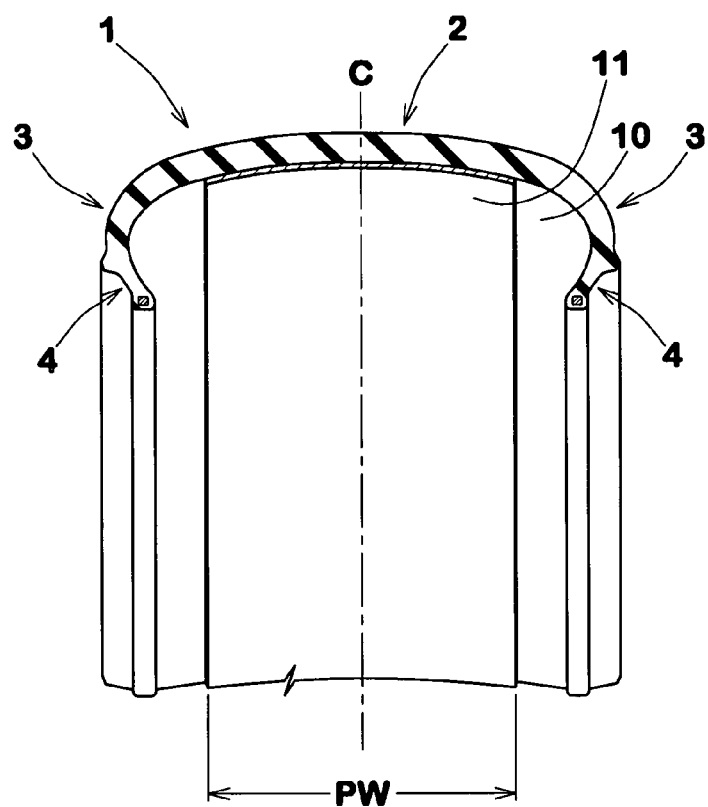
FIG. 3 is a partial perspective view of the tire viewed from the rotational center of the tire.
Figure 4:
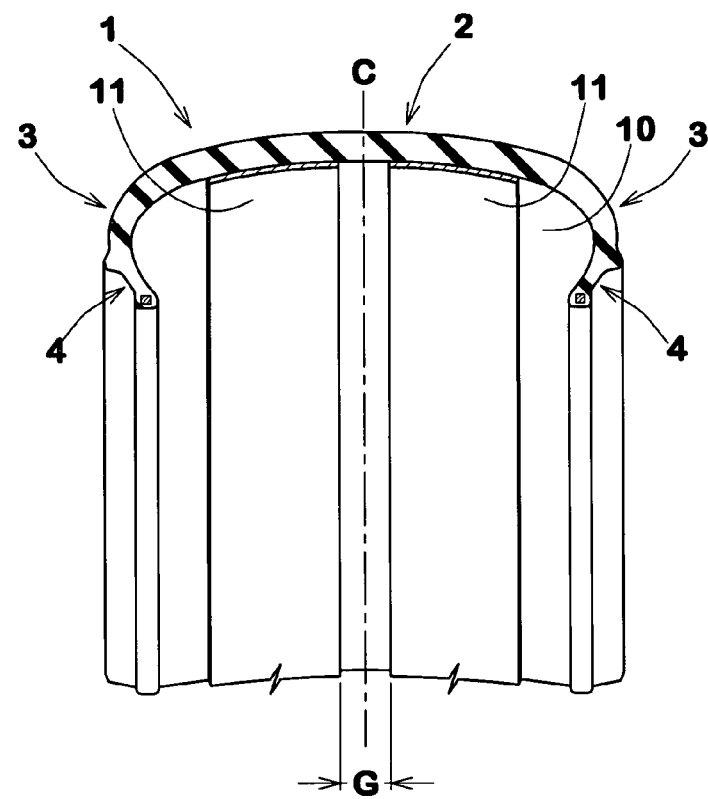
FIGS. 4, 5 and 6 are partial perspective views each showing another example of the tread tape.

Preferably, as shown in FIG. 3 and FIG. 4, the axial width of the tape 11 is substantially constant along the tire circumferential direction, in other words, the edges of the tape 11 are substantially straight. But, as shown in FIG. 5 and FIG. 6, the width of the tread tape 11 can be varied.

Figure 5:
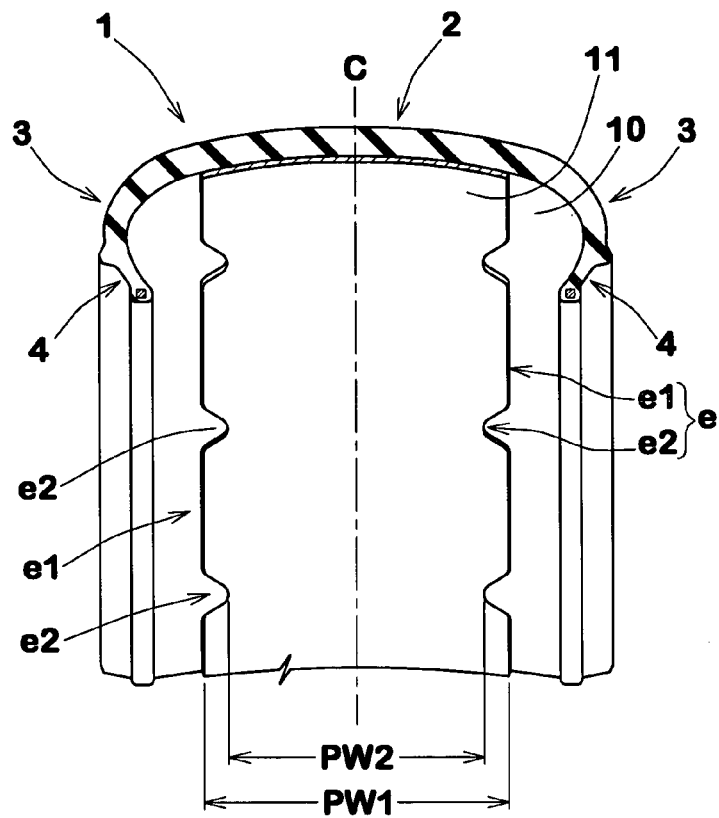
Figure 6:
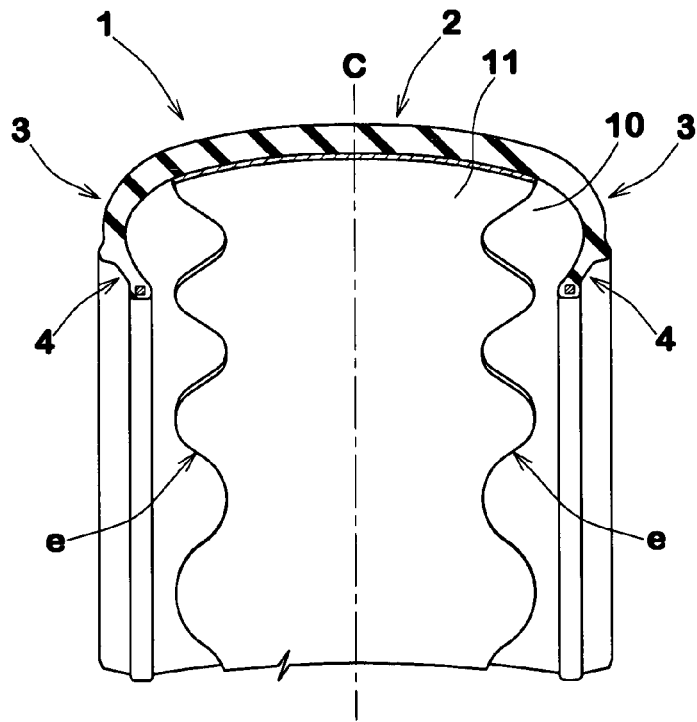

In the case of a single tape as shown in FIGS. 3, 5 and 6, the tape 11 is centered on the tire equator C.

In the case of a plurality of tapes, in order to provide an in-plane bending rigidity evenly, preferably the tapes having the same width (constant width tape) or same average width (variable width tape) are arranged symmetrically about the tire equator C as show in FIG. 4. In this example, two tread tapes 11 are disposed one on each side of the tire equator, leaving a space therebetween.

In FIG. 5, the side edges (e) of the tread tape 11 are provided with notches (e2) at regular intervals, and as a result, each side edge (e) is made up of circumferentially alternating circumferentially extending straight portions (e1) and notched portions (e2) of a generally triangular or V-shape. The circumferential positions of the notched portions (e2) on one of the side edges (e) are aligned with those on the other edge. Thus, the axial width of the tread tape 11 is intermittently decreased from PW1 to PW2.

As the notched portions (e2) can prevent the edges (e) from being crimpled, the edges (e) can locate as near as the tire shoulder portions, and as a result, the maximum effect can be obtained without deteriorating the durability.

FIG. 6 shows a further example of the tread tape 11 having a variable width. In this example, the side edges (e) of the tread tape 11 are formed in a zigzag or wavy form which does not include a circumferentially extending straight portion. Similar to FIG. 5 example, the zigzag or wavy form of one of the side edges (e) is aligned with that on the other edge.

In order to attach the tread tape 11 to the inner surface of the tire, an adhesive agent is preferably used.

In the case that the tape is made of a material not stretchable during vulcanizing the tire, for example, paper and nonwoven fabric, it is desirable that the tape is bonded to the inside of the tire after vulcanized with an adhesive.

As to the adhesive, for example, pressure sensitive adhesives; synthetic rubber adhesives such as solvent adhesives made by dissolving synthetic rubber in an organic solvent, and latex adhesives made by dispersing synthetic rubber into a water-based solvent; heat-curable adhesives such as epoxy adhesive; and the like can be used.

For the pressure sensitive adhesives, for example, rubber-based adhesives made from natural rubber and/or synthetic rubber and additives, e.g. tackifier, softener, age resistor and the like; acrylic adhesives made by copolymerizing acrylic esters having different glass transition temperatures and another functional monomer; silicone adhesives made from silicone rubber and resin; polyether adhesives; polyurethane adhesives; and the like can be used.

The adhesive agent is first applied to one side of the tape, then the tape is applied to the inside of the vulcanized tire. In the case of a pressure sensitive adhesive, it is especially preferable that the tape is prepared by applying the adhesive to one side of the tape like an adhesive tape used in packing.

During high speed running, the temperature of the pneumatic tire 1 often reaches to 120 degrees C. or more at the inside of the tread portion. Accordingly, it is necessary to maintain a sufficient adhesive strength even at such high temperatures as well as normal temperatures.

Figure 7:
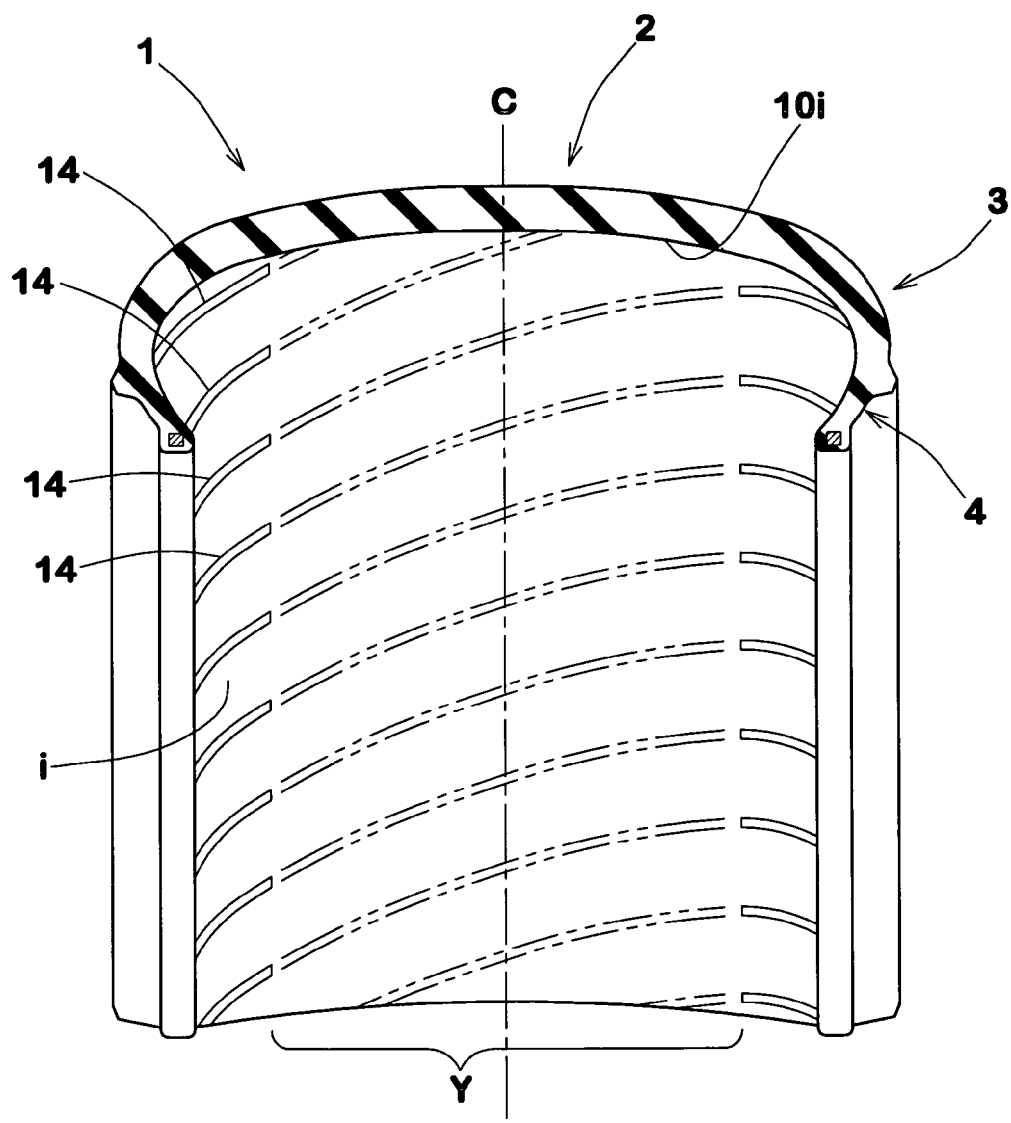
FIG. 7 is a partial perspective view of the tire to which the tread tape is not yet attached in order to show a smooth inner surface.

In order to improve the adhesive strength between the tread tape 11 and inner surface 10i of the tread portion 2, it is desirable that the inner surface 10i is a smooth and even surface although the inner surface of a pneumatic tire is, as shown in FIG. 7 by an imaginary line, conventionally provided with small ribs 14 due to vent grooves formed on the surface of an inflatable bladder used during vulcanizing the tire in order to pressurize the inside of the tire. In the embodiments descried above, instead of the conventional bladder whose entire surface is provided with vent grooves, a bladder whose central zone corresponding to the adhesive area Y only is not provided with vent grooves is used. If the conventional bladder is to be used, the small ribs 14 existing in the adhesive area Y are removed by buffing or the like to make it a smooth and even surface. In addition, it is better not to use a mold release agent.

After all it is desirable that the separation strength between the tape and the inside of the tire is in a range of not less than 0.147 N/10 mm (=0.015 kgf/mm) at 25 degrees C., and in a range of not less than 0.0588 N/10 mm (=0.006 kgf/mm) at 125 degrees C. To determine the separation strength, first the maximum value marked before the tape starts to separate when the force (N) by which an end of the tape is pulled perpendicularly to the tire inner surface is increased is measured, and the maximum value in Newton is divided by the width in mm of the tape end pulled and then multiplied by ten (mm).

Aside from the adhesive agent, in order to attach the tread tape 11 to the inner surface of the tire, a fusion bonding utilizing heat during vulcanizing the tire may be adopted. Further, it is possible to sandwich a tread tape 11 between the carcass and innerliner in making the raw tire to embed the tread tape in the tire.

Comparison Tests

Radial tires of size 215/45ZR17 (Rim size 17×7 JJ) for passenger cars having specifications given in Table 1 were made and tested for steering stability and ride comfort.

All the tread tapes had, as shown in FIG. 3, straight edges parallel with the tire circumferential direction and were fixed to the tires such that a pressure-sensitive adhesive was applied to one side of the tape in advance and stuck on the inner surface of the innerliner of the vulcanized tire.

Steering Stability Test:

The test tires were mounted on the four wheels of a test car (Japanese 2000 cc front-engine rear-drive car, and during running the test car in a tire test course, a test driver evaluated steering stability, based on steering response when the steering wheel was rotated by small angles from its central or neutral position, and also car's behavior when slow lane change and quick lane change were made. The tire pressure was 200 kPa. The test results are indicated in Table 1 by an index based on Ref. 1 being 100, wherein the larger the value, the better the steering stability.

Ride Comfort Test:

The test car was run on three types of road surfaces provided in the test course (well-paved smooth surface, rough surface and stepped surface provided with protrusions traversing the running course), and with respect to each surface, ride comfort was comprehensively evaluated by the test driver, based on the harshness, vibration, shock absorption at the time of running over the protrusions and damping thereafter which the driver felt. The test results are indicated in Table 1 by an index based on Ref. 1 being 100, wherein the larger the value, the better the ride comfort.

TABLE 1

| | Tire | | | | | | | | | | | | |
|---|---|---|---|---|---|---|---|---|---|---|---|---|---|
| | Ref. 1 | Ex. 1 | Ex. 2 | Ex. 3 | Ex. 4 | Ex. 5 | Ex. 6 | Ex. 7 | Ref. 2 | Ref. 3 | Ref. 4 | Ex. 8 | Ex. 9 |
| Tread tape Material | none — | single sulfate paper | single sulfate paper | single sulfate paper | single viscose staple fabric | single non-woven fabric | single non-woven fabric | single PE | single polyurethane foam | single PP | single PE | single polyester | single polyester |
| Thickness (mm) | — | 0.14 | 0.14 | 0.14 | 0.2 | 0.16 | 0.16 | 0.16 | 3.2 | 0.11 | 0.07 | 2 | 0.16 |
| Width PW/TW (%) | — | 54 | 10 | 90 | 54 | 54 | 21 | 54 | 54 | 54 | 54 | 54 | 54 |
| Tensile Strength (N/10 mm) | | | | | | | | | | | | | |
| Circumferential direction | — | 47 | 47 | 47 | 32 | 22 | 22 | 11 | 212 | 280 | 7 | 125 | 220 |
| Axial direction | — | 22 | 22 | 22 | 21 | 22 | 22 | 11 | 212 | 280 | 7 | 125 | 130 |
| Test Results | | | | | | | | | | | | | |
| Steering response | 100 | 110 | 103 | 115 | 103 | 110 | 105 | 103 | 125 | 130 | 100 | 125 | 125 |
| Slow lane change | 100 | 110 | 103 | 115 | 103 | 110 | 105 | 103 | 125 | 125 | 100 | 125 | 125 |
| Quick lane change | 100 | 100 | 100 | 100 | 100 | 100 | 100 | 100 | 105 | 105 | 100 | 105 | 105 |
| Ride comfort | | | | | | | | | | | | | |
| Smooth road surface | 100 | 100 | 100 | 100 | 100 | 100 | 100 | 100 | 90 | 90 | 100 | 100 | 100 |
| Rough road surface | 100 | 100 | 100 | 100 | 100 | 100 | 100 | 100 | 90 | 85 | 100 | 100 | 100 |
| Stepped road surface | 100 | 105 | 103 | 108 | 103 | 105 | 103 | 103 | 90 | 85 | 100 | 100 | 100 |

Note:
Tread width TW = 184 mm

The invention claimed is:

1. A pneumatic tire comprising
a tread portion defining a ground contacting width,
a pair of sidewall portions,
a pair of bead portions, and
a carcass made of cords extending between the bead portions through the tread portion and sidewall portions, wherein
the tread portion is provided radially inside the carcass with a flexible tread tape extending substantially continuously in the tire circumferential direction, and having a thickness of not more than 2.0 mm and a width of from 10 to 90% of the ground contacting width, the tread tape being made of a single homogeneous material which is a paper sheet, having a tensile elastic modulus larger than any rubber existing between the tread tape and the adjacent carcass cords,
wherein the tread tape has a tensile strength in the tire circumferential direction in a range of from 11 to 220 N/10 mm and a tensile strength in the tire axial direction in a range of from 11 to 130 N/10 mm.

2. The pneumatic tire according to claim 1, wherein
the tread tape is attached to the radially inner surface of an innerliner provided on the radially inside of the carcass.

3. The pneumatic tire according to claim 2, wherein
the tread tape is attached by the use of a pressure-sensitive adhesive, whereby a layer of the adhesive is formed between the tread tape and the innerliner.

4. The pneumatic tire according to claim 1, wherein
the width of the tread tape is more than 20% of the ground contacting width.

5. The pneumatic tire according to claim 1, wherein
the width of the tread tape is less than 80% of the ground contacting width.

6. The pneumatic tire according to claim 1, wherein
the tensile elastic modulus in the tire circumferential direction is the substantially same value as the tensile elastic modulus in the tire axial direction.

7. The pneumatic tire according to claim 1, wherein
the tensile elastic modulus in the tire circumferential direction is larger than the tensile elastic modulus in the tire axial direction.

8. A method of manufacturing a pneumatic tire with a tread tape according to claim 1, comprising
vulcanizing a main body of the tire excepting the tread tape, and
attaching the tread tape onto the inside of the vulcanized tire main body utilizing an adhesive material.

9. The method according to claim 8, which further comprises
applying said adhesive to one side of the tread tape before attaching the tread tape onto the inside of the vulcanized main body, wherein the adhesive is a pressure-sensitive adhesive.

* * * * *